Patented Nov. 30, 1926.

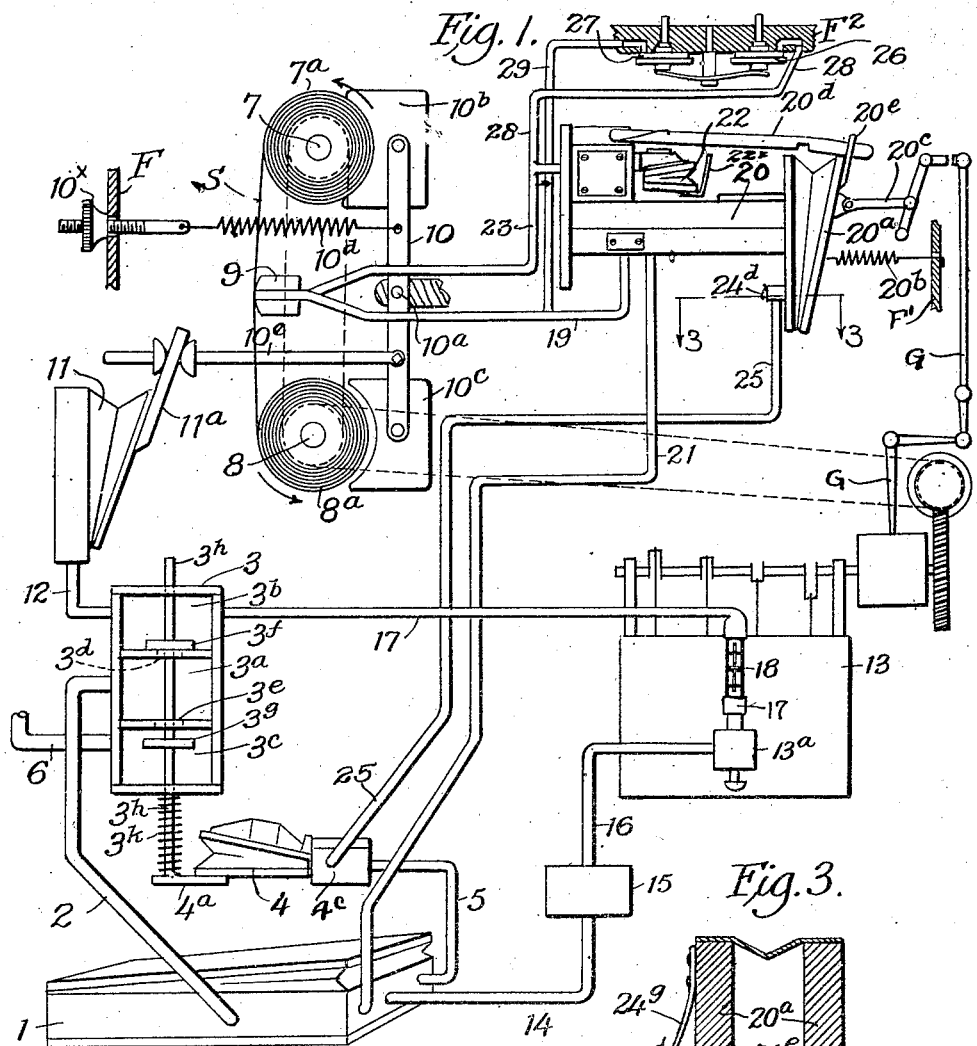
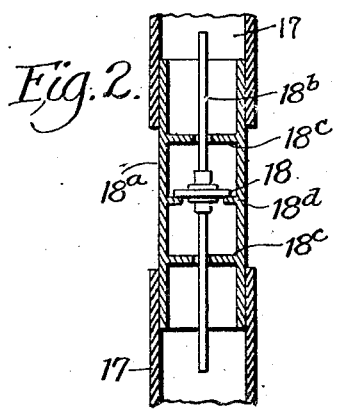
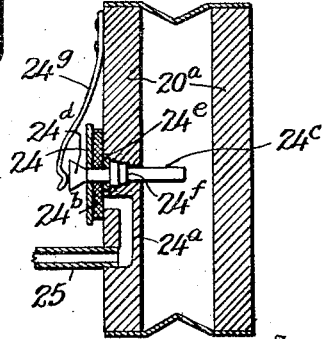

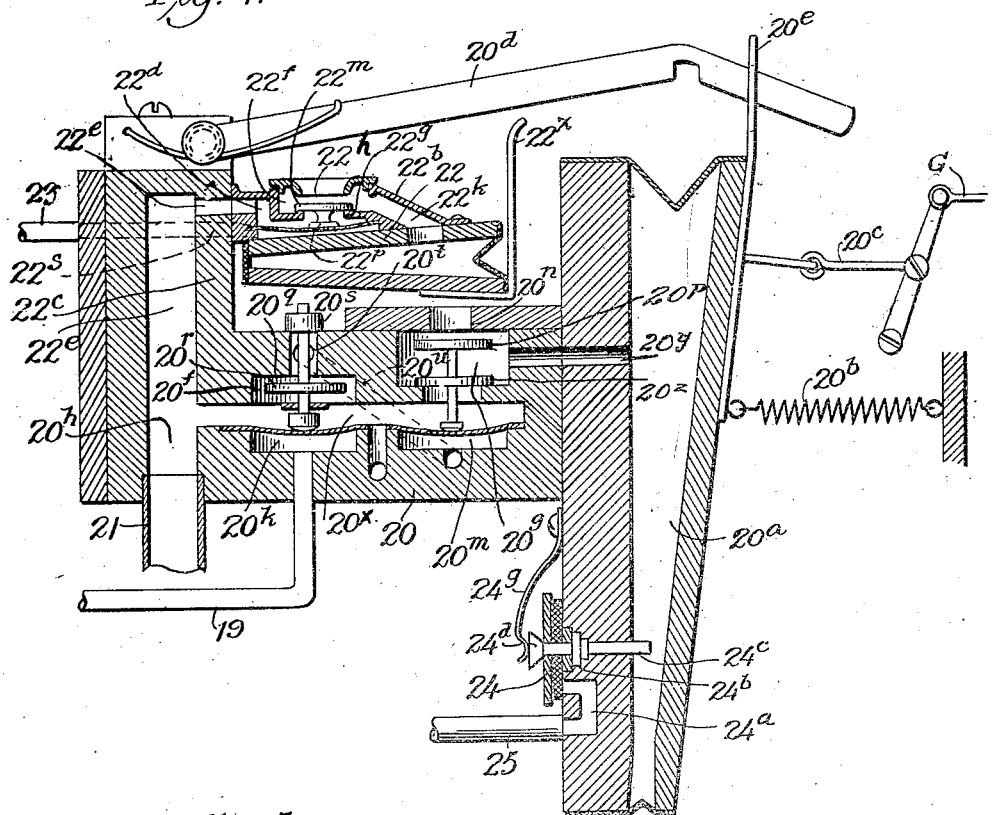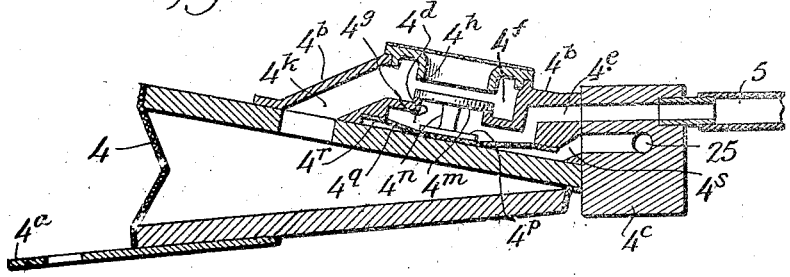

1,609,102

UNITED STATES PATENT OFFICE.

NORMAN G. BAKER, OF MUSCATINE, IOWA.

VACUUM BRAKE APPARATUS.

Application filed March 9, 1925. Serial No. 14,082.

This invention is a novel improvement in vacuum brake systems especially adapted for braking the music rolls of automatic band organs, pianolas, and the like, and the principal object of the invention is to provide an efficient, novel, and inexpensive, vacuum brake system embodying certain novel constructions and arrangements of parts whereby a minimum of such parts in the system will be required.

I will explain the invention with reference to the accompanying drawing which illustrates one practical embodiment thereof to enable others familiar with the art to adopt and use the same, and will summarize in the claims the essential features of the invention, the novel features of construction, and novel combinations of parts, for all of which protection is desired.

In said drawings:

Figure 1 is a diagrammatic view of the system.

Figure 2 is a longitudinal section through the vacuum check valve used in said system.

Figure 3 is a detail section through the vacuum release valve on the line 3—3, Fig. 1.

Fig. 4 is an enlarged section through the rewind device.

Fig. 5 is an enlarged section through the control bellows for operating the valves in the stop box.

As shown in the drawing, the system comprises a vacuum chest diagrammatically shown at 1, of any desired type, in which is maintained a constant vacuum, by any desired means. A hose connection 2 connects vacuum chest 1 with the middle compartment $3^a$ of a stop box 3, which box is subdivided in any desired manner into three normally non-communicating compartments $3^a$, $3^b$, and $3^c$, whereby vacuum is normally maintained in said middle compartment $3^a$. In the opposite walls of compartment $3^a$ are valve openings $3^d$, $3^e$, communicating with compartments $3^b$, $3^c$, respectively said openings being adapted to be closed by valves $3^f$, $3^g$, mounted upon a common valve rod $3^h$ passing through the box 3 and through the openings $3^d$, $3^e$, valves $3^f$, $3^g$, being so disposed upon rod $3^h$ that when the rod is moved in one direction valve $3^f$ will close its related opening $3^d$ while the other valve $3^g$ will remain unseated, but when rod $3^h$ is moved in the opposite direction valve $3^g$ will close its related opening $3^e$, while valve $3^f$ will remain unseated.

Valve rod $3^h$ is operably connected to a lug $4^a$ on the movable member of a normally open control bellows 4, and upon the rod $3^h$ between lug $4^a$ and the box 3, is a spring $3^k$ normally tending to seat valve $3^f$ upon its related opening $3^d$, to shut off communication between compartments $3^a$ and $3^b$, while establishing communication between compartments $3^a$ and $3^c$. A hose 5 connects bellows 4 with vacuum chest 1, whereby when bellows 4 is sucked closed as hereinafter described, by the vacuum in chest 1 rod $3^h$ will be shifted to shut off communication between compartments $3^a$ and $3^c$, and to open simultaneously communication between compartments $3^a$ and $3^b$.

As shown in section in Fig. 5 the control bellows 4 is provided with a valve casing $4^b$ of ordinary construction on its upper fixed member, the rear face of casing $4^b$ being connected to a block $4^c$ on the bellows in any desired manner. The valve casing $4^b$ is provided with a valve chamber $4^d$ communicating, by means of a duct $4^e$ extending through the casing and block $4^c$, with the hose 5 leading from the vacuum chest 1. Above the diaphragm chamber $4^d$ is a chamber $4^f$ communicating through aligned openings $4^g$, $4^h$, with the valve chamber $4^d$ and the atmosphere respectively. Preferably a customary screen may be provided over the opening $4^h$ to exclude dust and the like. A passage $4^k$ connects the chamber $4^f$ with the interior of the bellows 4. A valve $4^m$ operates in the chamber $4^f$ and is adapted to tightly close either the opening $4^g$ or $4^h$, said valve having a stem $4^n$ extending down into the valve chamber $4^d$, the lower end of the stem $4^n$ being provided with a button $4^p$ resting on a diaphragm $4^q$ in the lower part of the valve chamber. The portion of the valve chamber $4^r$ below the diaphragm $4^q$ communicates, by means of a duct $4^s$, with a pipe 25 communicating through a valve 24 on the rewind device (hereinafter described) with the atmosphere. A suitable bleeder or vent passage (not shown) may be provided connecting the chambers $4^d$ and $4^r$, above and below the diaphragm $4^q$, in the usual manner to permit restoration of an equilibrium of pressure on each side of the diaphragm $4^q$ after the latter has been in operation.

In brief when the air valve 24 is closed, air is excluded from the pipe 25 and chamber $4^r$ below the diaphragm $4^q$, and the valve $4^m$ will drop by air pressure on top of the valve and by suction in the valve chamber $4^d$ closing opening $4^g$, and air will enter the bellows through opening $4^h$ and passage $4^k$ to permit the bellows to open into normal position as shown in Fig. 5. When however air valve 24 is open, air will enter pipe 25 and will pass into chamber $4^r$ raising diaphragm $4^q$ and valve stem $4^n$, whereby valve $4^m$ will close the air opening $4^h$, and the vacuum of chamber $4^d$ will be extended through passage $4^k$ into the bellows 4, thereby sucking the bellows closed, and raising the stem $3^h$ of the valve in the stop box 3.

A pipe or hose 6 connects compartment $3^c$ with the usual pneumatic stack (not shown) upon which are mounted the usual individual bellows (not shown) which operate, by vacuum to pull down the individual keys of the instrument keyboard as the instrument is playing.

The perforated music strip S unwinds from shaft 7 as it winds upon shaft 8, while the instrument is playing in the usual manner, roll 7 being preferably disposed above and roll 8 below the usual tracker bar 9, and the music strip S passing in close contact with the tracker bar 9 in the usual manner. On shafts 7 and 8 are brake wheels $7^a$ and $8^a$ respectively. A brake arm 10, pivoted at $10^a$ intermediate its ends, is provided with a brake shoe $10^b$ adapted to contact with brake wheel $7^a$, and is also provided with a shoe $10^c$ adapted when the arm 10 is shifted to contact with brake wheel $8^a$. A spring $10^d$ having one end connected to the arm 10 adjacent brake shoe $10^b$, and its other end adjustably connected as by a nut $10^x$ to a fixed member F of the instrument frame as shown in Fig. 1, normally rocks arm 10 to urge shoe $10^b$ into contact with brake wheel $7^a$ to prevent shaft 7 from rotating faster than shaft 8 is driven by the wind motor 13 (hereinafter described) to wind up the strip S thereon, as the instrument is playing, and thus prevent strip S from flopping on the tracker bar 9, which flopping might cause the strip to rewind prematurely, or the notes to play at the wrong times.

Connected to arm 10 adjacent brake shoe $10^c$ is a link $10^e$ having its outer end connected to the movable member $11^a$ of a bellows 11, which bellows has a connection 12 to the compartment $3^b$ of stop box 3, whereby when bellows 11 is sucked shut, by vacuum as hereinafter explained, brake arm 10 will be rocked on its pivot $10^a$ to brake the wheel $8^a$ during the rewinding operation, so that shaft 8 will not rotate faster than shaft 7 is being driven by the wind motor 13 to wind up the music strip S thereon, and thus maintain a strip S in close contact with the tracker bar 9 during such rewinding operation.

The shafts 7 and 8 are operated in any suitable manner (shown diagrammatically in Fig. 1) from a wind motor diagrammatically shown at 13, which motor is driven, when the instrument is playing, by vacuum from chest 1 through a hose 14, tempo box 15, and through hose 16 entering the connecting box $13^a$ of said wind motor 13. Connecting box $13^a$ is further connected by a hose 17 with the compartment $3^b$ of stop box 3.

In hose 17, preferably adjacent the connecting box $13^a$ is a check valve 18, as shown in detail in Fig. 2, said valve preferably comprising a tubular casing $18^a$ open at both ends, and adapted to be inserted in the ends of a cut in hose 17 (as shown). Within the casing $18^a$ is an axially movable stem $18^b$ supported in guides $18^c$, said stem $18^b$ carrying the disk valve 18 adapted to normally seat upon an interior annular flange or seat $18^d$. The valve disk 18 should be so disposed that gravity will normally hold said disk upon its seat.

The usual rewind hole of tracker bar 9 is connected by hose 19 to the rewind device 20 (hereinafter described) having a bellows $20^a$, which bellows is normally held open by means of a spring $20^b$ having one end engaging the movable member of said bellows and the other end engaging a fixed member F' of the instrument frame. The movable member of said bellows $20^a$ operates the gear shift lever G through a lever $20^c$ so that when bellows $20^a$ is open the wind motor 13 will drive the shafts 7 and 8 in the playing direction as indicated by the arrows in Fig. 1, but when bellows $20^a$ is sucked closed by vacuum, the lever $20^c$ will throw the gear shift G to drive the shafts 7 and 8 in reverse direction for rewinding the strip S.

As shown in Fig. 4, the rewind device 20 is preferably provided with two valve chambers $20^f$ and $20^g$ which communicate with each other, and with the interior of the bellows $20^a$, and with the pipe 21 leading from the vacuum chest 1, by means of ducts $20^h$, $20^x$ and $20^y$ whereby vacuum from pipe 21 may be extended into the bellows $20^a$. Below the valve chambers $20^f$ and $20^g$ are diaphragm chambers $20^k$ and $20^m$, and suitable diaphragms separate the respective chambers $20^f$, $20^k$, also $20^g$, $20^m$. Above chamber $20^g$ is a valve seat $20^n$ communicating with the atmosphere, and a valve $20^p$ is adapted to seat against valve seat $20^n$ to shut off communication between the atmosphere and the duct $20^y$ leading into the bellows $20^a$. Valve $20^p$ is provided with a stem carrying a button which rests upon the diaphragm of chamber $20^m$. Also upon the stem of valve $20^p$ is a second valve $20^z$ within the chamber $20^g$ adapted to seat, when valve $20^p$ is open, to shut off communication between duct $20^x$ and chamber $20^g$; but when valve $20^p$ is closed then valve 20$^z$ will be open to extend the vacuum in duct 20$^x$ into chamber 20$^g$, duct 20$^y$, and bellows 20$^a$ sucking said bellows into closed position. Above valve chamber 20$^f$ is a bore 20$^t$ having a valve seat 20$^q$, against which a valve 20$^r$ is adapted to seat, bore 20$^t$ being open to the atmosphere. A duct 20$^u$ connects bore 20$^t$ above the seat 20$^q$ with the chamber 20$^m$. Valve 20$^r$ is mounted on a stem having a button normally resting upon the diaphragm of chamber 20$^k$ in which position valve 20$^r$ is unseated. Valve stem extends up through the bore 20$^t$ and above the top of the rewind device and carries a second valve 20$^s$ adapted to normally close communication between the bore 20$^t$ and the atmosphere when the valve 20$^r$ is unseated. As above stated the pipe 19 leading from the rewind hole in the tracker bar 9, or from the usual rewind button 27 on the instrument connects with the chamber 20$^k$ whereby air may be admitted to the chamber 20$^k$ below the diaphragm. Bellows 20$^a$ is normally held open by spring 20$^b$ and when so opened valve 24 is closed. Also when normally "playing", air is excluded from pipe 19 and the chamber 20$^k$, hence valve 20$^r$ is unseated from valve seat 20$^q$ while valve 20$^s$ closes bore 20$^t$, and hence vacuum extends from pipe 21 into bore 20$^t$ through pipe 20$^u$ and into chamber 20$^m$ causing valve 20$^p$ to unseat, and allow air to enter through valve seat 20$^n$ into bore 20$^y$ and to open bellows 20$^a$. Simultaneously with the opening of valve 20$^p$, valve 20$^z$ seats to break the vacuum from duct 20$^x$ extending into chamber 20$^g$, which vacuum would tend to close the bellows 20$^a$. The air, however, entering into the chamber 20$^g$ past the open valve 20$^p$ opens the bellows 20$^a$, such action being aided by the spring 20$^b$.

When however the rewind holes in sheet S register with the rewind holes in tracker bar 9 air enters pipe 19 and chamber 20$^k$ raising valve 20$^r$ against its seat 20$^q$ to cut off communication between bore 20$^t$ and chamber 20$^f$. At the same time valve 20$^s$ is unseated, permitting air to enter bore 20$^t$, and the air passes through duct 20$^u$ into chamber 20$^m$ opening valve 20$^z$ but closing valve 20$^p$ against its seat 20$^n$, and preventing air from passing in chamber 20$^g$ into the bore 20$^y$ and the bellows 20$^a$ whereby the bellows 20$^a$ is sucked into closed position by vacuum from pipe 21 through ducts 20$^h$, 20$^x$, past valve 20$^z$, chamber 20$^g$, and duct 20$^y$. In this position the notch in lever 20$^d$ will engage catch 20$^e$ on the movable member of bellows 20$^a$, and will hold bellows 20$^a$ which operates the clutch lever G closed, while the music rolls 7 and 8 are rewinding. A small bellows 22 is mounted on the rewind device 20, said bellows being operated by vacuum to release the catch lever 20$^d$ of bellows 20$^a$. A hose 23 connects this bellows 22 with the play holes in the tracker bar 9.

As shown in Fig. 4 the bellows 22 is similar to the bellows shown in Fig. 5, said bellows 22 being mounted upon the top of the rewind device 20 below the catch lever 20$^d$. Bellows 22 is provided with a valve casing 22$^b$ on its upper fixed member, the rear face of valve 22$^b$ being connected to a block 22$^c$ on the rewind device. Valve casing 22$^b$ is provided with a suction chamber 22$^d$ communicating by means of ducts 22$^e$ extending through the casing and block 22$^c$ with the vacuum duct 20$^h$ in the rewind device. Above the suction chamber 22$^d$ is a valve chamber 22$^f$ communicating through the aligned openings 22$^g$, 22$^h$, with the suction chamber 22$^d$ and the atmosphere respectively. A passage 22$^k$ connects the valve chamber 22$^f$ with the interior of the bellows 22. A valve 22$^m$ operates in the chamber 22$^f$ to tightly close the opening 22$^g$ or 22$^h$ said valve having a stem extending down into the suction chamber, the lower end of stem being provided with a button 22$^p$ resting on a diaphragm in the lower part of the suction chamber. The chamber below the diaphragm communicates by means of a duct 22$^s$ with pipe 23 leading from the play holes in tracker bar 9. A suitable bleeder or vent passage (not shown) may be provided connecting the chambers above and below the diaphragm in the usual manner to permit restoration of an equilibrium of pressure on each side of the diaphragm after the latter has been in operation.

In brief when the air is excluded from below the diaphragm, valve 22$^m$ will drop closing opening 22$^g$ by air pressure on top of the valve, and by suction through the valve chamber 22$^d$ from vacuum chest 1, and air will enter the bellows 22 through opening 22$^h$ and passage 22$^k$, to open the bellows 22 when the instrument is playing. When however air enters pipe 23 it will enter below the diaphragm, raising the latter and the valve, whereby valve 22$^m$ will close the opening 22$^h$, and vacuum from pipe 21 will extend through passage 22$^k$ and into the bellows 22 thereby sucking the bellows closed, and raising the tongue 22$^x$ on the movable member of bellows 22, to raise the catch lever 20$^d$, and permit spring 20$^b$ to pull bellows 20$^a$ open.

I provide a hose 25 leading from the stop box control bellows 4, and opening into the atmosphere said hose being normally closed by a push button valve shown in detail in Fig. 3. In the fixed member of bellows 20$^a$ is a U-shaped duct 24$^a$ into which is secured one end of the hose 25, the other end of said duct 24$^a$ opening into the atmosphere. Adjacent the open end of the duct 24$^a$ is a push-button valve comprising a disk 24 of any desired metal such as brass, having a leather packing or washer 24$^b$ attached to its inner face, said valve 24 being loosely mounted on a valve stem 24ᶜ passing through an opening into the fixed member of bellows 20ᵃ. The outer end 24ᵈ of stem 24ᶜ is preferably flared or cone-shaped to retain the disk 24 upon the stem 24ᵈ while permitting the disk to assume a slight angularity with respect thereto. A small washer 24ᵉ on stem 24ᶜ is interposed between the opposite face of the disk and an eyelet or shoulder 24ᶠ to normally hold the disk against the flared end 24ᵈ of the valve stem. The above construction of the valve and stem permits the valve disk 24 to seat effecting in case dirt should get between the packing 24ᵇ and the face of the bellows 20ᵃ. Stem 24ᶜ passes through the fixed member of bellows 20ᵃ and into the path of the movable member. A flat spring 24ᵍ engaging outer end of valve stem 24ᶜ normally presses the disk to close the open end of duct 24ᵃ, and hence to close hose 25. When however bellows 20ᵃ is sucked shut the valve stem 24ᶜ will be moved by the engagement of said stem with the movable member of bellows 20ᵃ to move the disk to uncover said duct 24ᵃ. Hence when bellows 20ᵃ is open valve 24 is closed, but when bellows 20ᵃ is closed, valve 24 is open.

In a convenient portion of the instrument casing, as at F², I provide two push button valves 26 and 27 normally closing the entrances to two hoses 28 and 29 (see Fig. 1) said valves being preferably similar in construction to valve 24, but adapted to be manually operated by the player of the instrument. Hose 28 connects with the hose 23 leading from the play holes of the tracker bar 9, while hose 29 connects with the hose 19 leading from the rewind hole of the tracker bar 9. Hence when the instrument is playing and rewind push button valve 27 is depressed air is admitted to hose 19 and the instrument will thereupon start to rewind. While thus rewinding if push button valve 26 is depressed, air will be admitted to hose 23 and the instrument will thereupon start again to play.

Operation.

In operation, the compartment 3ᵃ of stop box 3 is under constant vacuum from vacuum chest 1. When the instrument is playing control bellows 4 is open and valve rod 3ʰ depressed thereby maintaining vacuum in compartment 3ᶜ of stop box 3, and in hose 6 leading to the pneumatic stack, thereby operating the keys of the instrument key board as the perforations in strip S register with those of tracker bar 9. During this time the motor 13 is being continuously operated by vacuum in hose 14, tempo box 15, and hose 16, directly from vacuum chest 1, to rotate the shafts 7 and 8 in the playing direction. Compartment 3ᵇ of stop box 3 is shut off from vacuum chest 1 by valve 3ᶠ and hence the brake bellows 11 is in its normal open position, spring 10ᵇ rocking brake arm 10 to brake the wheel 7ᵃ of shaft 7 and hence preventing the shaft 7, from which the music strip is unwinding, from rotating faster than shaft 8 is being driven by the wind motor 13, the music strip S winding upon shaft 8. Also during this time the bellows 20ᵃ of the rewind device 20 is held in open position by spring 20ᵇ.

However, while the instrument is thus playing and communication between the compartment 3ᵇ cut off by valve 3ᶠ from compartment 3ᵃ, vacuum is maintained in hose 14, tempo box 15, hose 16, and in the connecting box 13ᵃ of the wind motor 13, which connecting box 13ᵃ is directly connected to compartment 3ᵇ by hose 17. Hence there would be vacuum in hose 17 and in compartment 3ᵇ, and brake bellows 11 would always be closed and continuously hold brake shoe 10ᶜ against brake wheel 8ᵃ except for the interposition of check valve 18 in pipe 17. The weight of valve disk 18 augumented by the vacuum in connecting box 13ᵃ will tend to close the disk 18 against its seat 18ᵈ, and prevent establishing vacuum in compartment 3ᵇ.

After the music plays to the end of strip S, and the usual rewind holes in strip S register with the usual rewind hole in tracker bar 9, or if push button valve 27 is depressed air will pass through hose 19 into the rewind device 20 operating a valve (not shown) in the usual manner to permit vacuum in chest 1 and hose 25 to suck bellows 20ᵃ shut, thereby reversing the direction of rotation of the shafts 7 and 8, and opening valve 24 on bellows 20ᵃ. The notched lever 20ᵈ will maintain bellows 20ᵃ in closed position until released by the opening of small bellows 22. While valve 24 is open air passes through hose 25 to the valve to stop box control bellows 4 establishing vacuum in bellows 4 which sucks same shut thereby pushing valve rod 3ʰ up, and establishing vacuum in the compartment 3ᵇ of stop box 3, the operation of rod 3ʰ simultaneously closing communication between compartments 3ᵃ and 3ᶜ and destroying the vacuum in the pneumatic stack whereby the keys of the instrument keyboard cannot play notes at a discord while the strip S is rewinding. The vacuum in compartment 3ᵇ will suck bellows 11 shut, thereby rocking brake arm 10 to brake the shaft 8 during the rewinding operation, and furthermore, the excess vacuum in compartment 3ᵇ and hence in hose 17 will suck valve 18 open, and augment the partial vacuum in the wind motor 13, and increasing the speed of the wind motor 13 during rewinding, which result is very desirable.

After rewinding, when bellows 20ᵃ is open by the releasing of catch lever 20ᵈ upon the closing of small bellows 22, valve 24 is closed, and consequently stop box control bellows 4 will again open, permitting valve rod 3ʰ to drop thereby closing communication between compartments 3ᵃ and 3ᵇ, which operation takes place after the music strip S is rewound and the play holes in the strip S strike the play holes in the tracker bar, and the roll is ready to play over again, or if push button valve 26 is depressed by the operator.

The above described construction and arrangement of parts provides a simple and efficient vacuum brake system for automatic musical instruments in which the roll from which the music is unwinding, either in the playing or rewinding direction, will be automatically braked; the excess vacuum during rewinding will be set up in the wind motor to increase the speed of rotation thereof during rewinding; valve 18 automatically prevents vacuum in the wind motor 13 operating the brake bellows 11 while the instrument is playing, and valve 24 on the rewind device automatically admits vacuum into the brake bellows 11 during rewinding.

I claim:

1. In an apparatus for braking the music rolls of automatic musical instruments, having a music roll brake, a brake bellows for shifting the brake, a vacuum chest, and a connection between said chest and said brake bellows; of a normally closed valve in the connection between said vacuum chest and brake bellows; and means for automatically opening said valve when said brake is to be shifted.

2. In an apparatus as set forth in claim 1, said means comprising a control bellows operatively connected with said valve; a spring for normally maintaining said bellows open to close said valve; a connection between said control bellows and the vacuum chest; a normally closed valve in said connection; a diaphragm controlling the latter valve an air pipe connecting with said diaphragm; a push button valve in said air pipe for admitting air into said air pipe valve; a spring for normally closing said push button valve; and means for automatically opening said push button valve, when the music is rewinding.

3. In an apparatus for braking the music rolls of automatic musical instruments, having a wind motor and connections for driving the music rolls, means for reversing the direction of rotation of said music rolls including a reversing bellows, a music roll brake, a brake bellows for shifting the brake, a vacuum chest, and a connection between said chest and said brake bellows; of a normally closed valve in the connection between said vacuum chest and brake bellows; and means for automatically opening said valve when said brake is to be shifted.

4. In an apparatus as set forth in claim 3, said automatic means comprising a control bellows operatively connected with said valve; a spring for normally maintaining said bellows open to close said valve; a connection between said control bellows and the vacuum chest; a normally closed valve in said connection; a diaphragm controlling the latter valve, an air pipe connecting with said diaphragm; a push button valve on the reversing bellows for closing said air pipe; a spring for normally closing said push button valve, said valve having its stem entering into said reversing bellows, whereby when the reversing bellows is closed said push button valve will be opened, admitting air into said air pipe to actuate the said diaphragm to open said second mentioned valve, and cause said control bellows to open said valve in the connection between the vacuum chest and brake bellows.

5. In an apparatus as set forth in claim 3, a connection between the wind motor and the brake bellows; and a normally closed check valve in said connection to prevent establishing vacuum in said brake bellows while the instrument is playing; while permitting vacuum being established in said brake bellows when the valve in the connection between the vacuum chest and brake bellows is opened, the excess vacuum set up in said connection between the wind motor and brake bellows opening said check valve and augmenting the vacuum in said wind motor, whereby the speed of the latter during rewinding will be increased.

6. In an apparatus for braking the music rolls of automatic musical instruments, having a tracker bar, a wind motor, and connections driving said music rolls; a vacuum chest, means for reversing the direction of rotation of said music rolls including a reversing bellows, a connection between said reversing bellows and the vacuum chest, means cooperating with said tracker bar for establishing vacuum in said reversing bellows at the end of a music strip, a brake normally braking the roll from which the music strip is unwound when the instrument is playing, a brake bellows for shifting the brake for rewinding, a vacuum chest, and a connection between said chest and said brake bellows; of a normally closed valve in the connection between said vacuum chest and brake bellows; and means for automatically opening said valve when said reversing bellows closes.

7. In apparatus as set forth in claim 6, said automatic means comprising a control bellows operatively connected with said valve; a spring for normally maintaining said brake bellows open to close said valve; a connection between said control bellows and the vacuum chest; a normally closed valve in said connection; a diaphragm for operating the latter valve, an air pipe connecting with said diaphragm; a push button valve on the reversing bellows for operating said diaphragm; a spring for normally closing said push button valve; said valve having its stem entering into said reversing bellows, whereby when the reversing bellows is closed said push button valve will be opened, admitting air into said diaphragm to actuate the said valve, and cause said control bellows to open the valve in the connection between the vacuum chest and brake bellows.

8. In an apparatus as set forth in claim 6, a connection between the wind motor and the brake bellows; and a normally closed check valve in said connection to prevent establishing vacuum in said brake bellows while the instrument is playing, but permitting vacuum being established in said bellows, when the first mentioned valve is opened, the excess vacuum set up in said connection opening said check valve, and augmenting the vacuum in said wind motor, whereby the speed of the latter during rewinding will be increased.

In testimony that I claim the foregoing as my own, I affix my signature.

NORMAN G. BAKER.